(No Model.)
M. D. TEMPLE.
RUBBER BUCKET FOR CHAIN PUMPS.
No. 290,282. Patented Dec. 18, 1883.
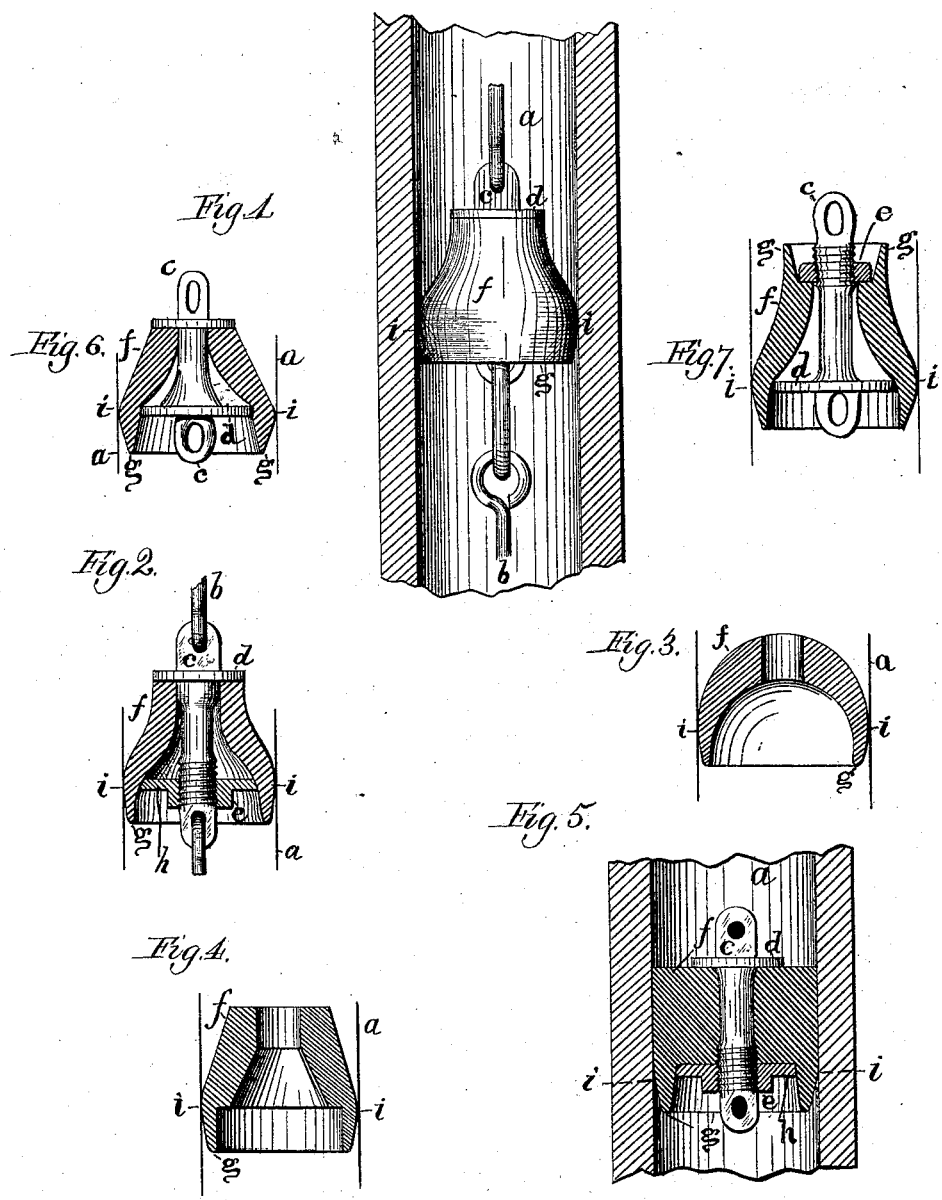
Witnesses:
O. E. Gaylord
Henry Decker
Inventor:
Morris D. Temple
By Wm. Zimmerman
Atty

UNITED STATES PATENT OFFICE.

MORRIS D. TEMPLE, OF CHICAGO, ILLINOIS.

RUBBER BUCKET FOR CHAIN-PUMPS.

SPECIFICATION forming part of Letters Patent No. 290,282, dated December 18, 1883.

Application filed December 22, 1882. (No model.)

*To all whom it may concern:*

Be it known that I, MORRIS D. TEMPLE, of Chicago, in the county of Cook and State of Illinois, have invented certain new and useful Improvements in Rubber Buckets for Chain-Pumps; and I hereby declare the following to be a full, clear, and exact description thereof, which will enable others skilled in the art to which my invention relates to make and use the same, reference being had to the accompanying drawings, forming a part hereof, and in which—

Figure 1 represents a vertical sectional view of a pump-tube, with bucket and part of chain shown in full. Fig. 2 represents a central sectional elevation of the rubber bucket, nut, and washer, the remaining parts being shown in full. Fig. 3 represents a central sectional elevation of a hemispherical hollow rubber of a bucket. Fig. 4 represents a central sectional elevation of a conical hollow rubber of a bucket. Fig. 5 represents a cylindrical solid rubber bucket in sectional elevation, with its nut $e$ and washer $h$ in section, as also the pump-tube and the other parts of the bucket in full. Fig. 6 represents the rubber of a bucket in central sectional elevation held between the flanges fixed to the bolt $c$. Fig. 7 represents a central sectional elevation of the rubber member, the remaining parts being shown in full, and showing the nut and washer at its small end.

Like letters of reference indicate like parts.

The object of my invention is to construct a rubber bucket that will protect its expanding-nut from contact with the forks of the wheel by which the chain carrying the buckets is rotated. As at present constructed no such guard is provided, and the expanding-nuts, striking the forks of the chain-wheel, become loose and work off, thereby permitting the rubber to contract so much as to prevent its raising water by suction, and when said nuts are made of soft metal they are soon destroyed by such contact with the chain-wheel. Such difficulties are effectually overcome in rubber buckets constructed as herein shown.

In the drawings, $a$ represents the pump-tube, and $f$ the rubber part of the bucket. $c$ is a bolt provided with a fixed flange, $d$, at one end, against which rests one end of the rubber $f$, and against which the rubber $f$ is pressed by the nut $e$, which is provided with a flange, $h$, or the flange may be a separate piece or a washer. The rubber may be constructed in the various forms shown in the several figures or modifications thereof; but, as heretofore made, it was always stopped at the bearing with the pump-tube $i$, and thus left the nut $e$ exposed and liable to be struck by the forks of the chain-wheel, become injured, loosened, and knocked off from the bolt $c$ and thus cause the rubber $f$ to become loose and contracted in the tube, so that water will pass down around and outside of it, greatly impairing, and in many cases destroying, its usefulness. To obviate this difficulty, I construct the rubber part of my bucket with a rim or guard, $g$, extending from its bearing with the pump-tube at $i$, and forming a continuous part of the rubber $f$, which completely shields the nut from contact with the forks of the chain-wheel. The guard is also contracted from the bearing with the pump-tube at $i$, so as to permit the bucket to slip backward in the pump-tube as well as forward, and thereby prevent the rubber from becoming injured when the chain runs backward for a greater or less distance, as it always does when the handle or crank is released, unless the pawl happens to catch a notch of the ratchet-wheel at the instant the hand of the operator is removed from the crank. The small end of the rubber $f$ usually rests against the flange $d$, and the nut $e$ and washer $h$ are operated from the large end of the rubber, as shown in Fig. 2; but this order may be reversed, as shown in Fig. 7, and the guard $g$ placed on the small end of the rubber to protect the nut $e$. The bucket may be made to pass upward through the tube, as shown in the drawings, or reversed with the large end ahead, and it will operate either way without injury to the rubber, and when the end having the rim or guard $g$ precedes in its motion, the rim or guard forms an air-bucket which carries air into the water as it descends, and when the bucket turns upward the air is released and bubbles up through the water, eliminating the gases and purifying the water.

The rubber $f$ may be used as a non-expansive bucket by being sprung into place between two fixed flanges on the bolt $c$, as shown in Fig. 6.

What I claim as my invention, and desire to secure by Letters Patent, is—

1. In a rubber bucket for chain-pumps, the rubber $f$, provided with a rim, $g$, of decreasing diameter from the point $i$, and depending from the bucket so as to form a guard, substantially as specified.

2. In chain-pump buckets, the rubber $f$, provided with a dependent rim, $g$, of decreasing diameter from the point $i$, in combination with a bolt having a fixed plate, $d$, and expanding nut $e$, substantially as specified.

MORRIS D. TEMPLE.

Witnesses:
JOHN F. TEMPLE,
FRANK A. MOONEY.